United States Patent Office 3,201,367
Patented Aug. 17, 1965

3,201,367
ALKYLENE OXIDE POLYMERS STABILIZED
WITH UREA COMPOUNDS
Keith L. Smith, Charleston, W. Va., assignor to Union
Carbide Corporation, a corporation of New York
No Drawing. Filed Oct. 12, 1960, Ser. No. 62,162
11 Claims. (Cl. 260—45.9)

This invention relates to alkylene oxide polymers. In one aspect, this invention relates to the stabilization of alkylene oxide polymers against appreciable molecular degradation during storage, which in transit, during processing, and the like.

This application is a continuation-in-part of an application entitled, "Alkylene Oxide Polymers," Serial No. 765,-042, filed October 3, 1958, now abandoned.

The tendency for alkylene oxide polymers to degrade has presented a serious problem in those fields of application where molecular weight stability is both a necessary and desirable feature. It has been noted noted that solid ethylene oxide polymers can undergo a substantial loss in average molecular weights when stored in solid form at room temperature for several days, when subjected to elevated temperatures for short periods of time, or when stored in the form of aqueous or organic solutions. The effect of the reduced viscosity loss or molecular weight degradation is more prevalent as the molecular weight of the polymer increases. The particular use to which the polymer is ultimately put, will largely be determinative of the permissible variation of the molecular weight range. For instance, a customer who orders a solid ethylene oxide polymer of a definite viscosity range of a particular field of application desires a product of relative stability or enhanced stability especially during storage or in transit. However, unless the ethylene oxide polymer is adequately protected against substantial molecular weight degradation, the loss in molecular weight can be so serious as to completely change the physical character of the polymer from a tough resin to a brittle wax, and as a consequence, the resulting degraded polymer has limited applicability or no applicability for the original intended use.

In particular, ethylene oxide polymers prepared by a suspension polymerization technique using a metal amide catalyst exhibit a marked degree of instability under the aforesaid conditions. Moreover, the usefulness of these resins has been somewhat hampered by the problem of maintaining the stability of such polymers especially when in solution. The instability associated with polymers prepared by suspension polymerization has been observed to be over and above those problems peculiar to high molecular weight ethylene oxide polymers in general.

The present invention, therefore, contemplates the stabilization of resinous ethylene oxide polymers prepared by the suspension polymerization of ethylene oxide in the presence of a catalyst selected from the group consisting of alkaline earth metal amides, alkaline earth metal hexammoniates, and alkaline earth metal amide-alcoholates by incorporating therein a stabilizing amount of a compound selected from the group of urea, thiourea, and certain derivatives thereof. By the practice of the instant invention the ethylene oxide polymers exhibit improved stability against molecular degradation during storage, transit, or in aqueous or organic solution over a period of several weeks as compared with the corresponding ethylene oxide polymers lacking the above-mentioned classes of stabilizers.

Accordingly, one or more of the following objects will be achieved by the practice of the instant invention. It is an object of this invention to improve the stability of ethylene oxide polymers against molecular degradation. It is another object of this invention to provide a novel composition comprising a resinous ethylene oxide polymer and a stabilizing amount of a stabilizer hereinafter described. Another object is to improve the stability of ethylene oxide polymers comprised of at least 50 weight percent of ethylene oxide in copolymerized form with up to 50 weight percent of a lower olefin oxide which is selected from the group consisting of propylene oxide and butylene oxide. A further object of the present invention is to improve the stability of ethylene oxide polymers which have a reduced viscosity value in the range of from about 1 to about 75, and higher, against molecular degradation. A still further object of this invention is to render granular poly(ethylene oxide) which has been prepared by the suspension polymerization using a catalyst such as an alkaline earth metal amine, hexammoniate, or mixture thereof, or an alkaline earth metal amide-alcoholate, relatively stable against molecular weight degradation by incorporating thereto a stabilizing amount of a stabilizer hereinafter described. These and other objects will readily become apparent to those skilled in the art in the light of the teachings herein set forth.

In accordance with the present invention it has been found that the molecular weight stability of resinous ethylene oxide polymers, prepared by a suspension polymerization technique using the aforesaid catalysts and which have a reduced viscosity of at least about 1.0, can be considerably enhanced or improved during storage, in transit, in aqueous or organic solutions, by incorporating therein a stabilizing amount of a compound selected from the group of urea, arylurea, N,N'-diarylurea, N,N-diarylurea, acylurea, N-acyl-N'-alkylurea, dichloralurea, thiourea, N,N'-dialkylthiourea, alkylthiourea, N,N'-diarylthiourea, arylthiourea, alkenylthiourea, and acylthiourea.

Illustrative stabilizers contemplated in the instant invention include, among others, urea, phenylurea, ortho-, meta-, and para-tolylurea, xylylurea, N,N-dihphenylurea, N,N' - diphenylurea, N,N' - ditolylurea, dichloralurear, N-acetyl-N'-methylurea, N-propionyl-N'-ethylurea, N-acetyl-N'-butylurea, N-propionyl-N'-hexylurea, acetylurea, propionylurea, thiourea, methyl thiourea, ethylthiourea, propylthiourea, amylthiourea, octylurea, N-ethyl-N'-octyl-thiourea, N,N'-diethylthiourea, N,N'-di-n-butylthiourea, N,N'-dioctylthiourea, phenylthiourea, N,N'-diphenylthiourea, N,N'-ditolylthiourea, allylthiourea, crotylthiourea, acetylthiourea, propionylthiourea, and the like.

For brevity, the term "stabilizer" is often employed throughout this specification to include the above-mentioned urea, thiourea, and the appropriate derivatives thereof. It should also be noted that the act of "stabilizing" the resinous ethylene oxide polymer is not to be confused with the process of "inhibiting" or "retarding" the polymerization of polymerizable monomers, or with the process or act of "shortstopping" polymer from further polymerization.

The ethylene oxide polymers encompassed by the instant invention include ethylene oxide homopolymers and ethylene oxide copolymers comprised of at least 50 weight percent of ethylene oxide in copolymerized form with up to 50 weight percent of a lower olefin oxide which is selected from the group consisting of propylene oxide and butylene oxide.

As previously indicated, the use of the aforementioned stabilizers to inhibit molecular degradation of ethylene oxide polymers is unique for stabilizing poly(ethylene oxide) prepared by a suspension polymerization technique using an amide catalyst. For polymers prepared by this process the stability problem is believed to be due, in part, to degrading agents inherently present in the catalyst or catalyst residue. For instance, it has been observed that the addition of metal amide polymerization catalysts to any ethylene oxide polymer, no matter how this polymer was made, results in severe degradation. Furthermore, the degradation resulting from the metal amide catalyst residue has been observed to be over and above that caused by oxidative attack, chemical hydrolysis, or mechanical shear. Thus, it is not the purpose of this invention to provide effective stabilizers for ethylene oxide polymers which specifically prevent oxidative attack or chemical hydrolysis, inasmuch as degradation by these routes appears to be substantially independent of the viscosity loss mechanism, i.e., molecular weight degradation, involved in metal amide residue attack. Tables I and II illustrate the effect of suspension polymerization catalysts and solution polymerization catalysts on the viscosity of poly(ethylene oxide) solutions:

TABLE I.—EFFECT OF SUSPENSION POLYMERIZATION CATALYSTS ON VISCOSITY OF AQUEOUS POLY(ETHYLENE OXIDE) SOLUTIONS [1]

| Catalyst [2] | Concentration [3] | Viscosity loss after one week at 25° C.[4] | |
|---|---|---|---|
| | | Comparable control | Treated solution |
| Calcium amide, high polymerization activity | 2 | 21.7 | 67.6 |
| Do | 1 | 21.6 | 46.5 |
| Calcium amide, low polymerization activity | 2 | 21.7 | 53.8 |
| Do | 1 | 21.6 | 36.0 |
| Calcium amide containing high proportion of calcium hexammoniate | 2 | 19.3 | 48.4 |
| Calcium amide butylate | 2 | 19.3 | 49.4 |
| | | 31.9 | 75.6 |
| Strontium amide | 2 | 19.3 | 49.6 |

[1] One percent by weight of poly(ethylene oxide) in water.
[2] Added to the poly(ethylene oxide) solution.
[3] Concentration in percent by weight of polymer present.
[4] Viscosity loss measured in percent.

TABLE II.—EFFECT OF SOLUTION POLYMERIZATION CATALYSTS ON VISCOSITY OF AQUEOUS POLY(ETHYLENE OXIDE) SOLUTION [1]

| Catalyst [2] | Concentration [3] | Viscosity loss after one week at 25° C.[4] | |
|---|---|---|---|
| | | Comparable control | Treated solution |
| Calcium glycoxide | 2 | 19.3 | 13.7 |
| Calcium carbonate | 1 | 20.3 | 17.6 |
| Strontium carbonate | 2 | 19.3 | 19.8 |

[1] One percent by weight of poly(ethylene oxide) in water.
[2] Added to the poly(ethylene oxide) solution.
[3] Concentration in percent by weight of polymer present.
[4] Viscosity loss measured in percent.

Of the several compounds listed in Table I, calcium amide is representative of the catalyst used in the suspension polymerization of ethylene oxide. Calcium amide is not stable in water and when added to an aqueous solution of poly(ethylene oxide) the resulting degradation products act as strong viscosity reducing agents. Similarly, the various derivatives of calcium amide which are highly useful in promoting polymerization of ethylene oxide, are equally detrimental in molecular weight degradation. Conversely, the catalysts used in solution polymerization apparently have a mild beneficial effect upon stability as indicated in Table II. In the case of the solution polymerized resin and the lower molecular weight poly(ethylene glycols), the effect of the calcium amide on stability is not as great largely due to the fact that these materials are much lower in viscosity and less susceptible to degradation.

As noted in the preceding Tables I and II, the suspension polymerization catalysts markedly affect the viscosity of poly(ethylene oxide) solutions while, in contrast, the solution polymerization catalysts have little or no degradative effect. Morevore, the viscosity loss when an amide catalyst is aded to poly(ethylene oxide) solutions does not differ greatly for poly(ethylene oxide) which has been prepared by suspension polymerization techniques. Table III further demonstrates the effect of catalyst addition on the viscosity of ethylene oxide polymers prepared by different polymerization methods.

TABLE III.—EFFECT OF CATALYST ADDITION ON VISCOSITY OF SOLUTIONS OF ETHYLENE OXIDE POLYMERS PREPARED BY DIFFERENT POLYMERIZATION METHODS

| Solution | Catalyst | Catalyst Concentration [1] | Viscosity loss after one week at 25° C.[2] |
|---|---|---|---|
| Suspension polymerized poly(ethylene oxide).[3] | None | | 19.3 |
| | Calcium glycoxide | 2 | 13.7 |
| | Calcium amide | 2 | 67.6 |
| | Hydrazine | 0.027 | 87.5 |
| Solution polymerized poly(ethylene oxide).[4] | None | | 4.05 |
| | Calcium amide | 2 | 17.6 |
| Polyethylene glycol (molecular weight 1500–1600). | None | | 0.0 |
| | Calcium amide | 2.7 | 24.1 |
| | Hydrazine | 0.027 | 10.3 |
| Polyethylene glycol (molecular weight 570–630). | None | | 0.0 |
| | Calcium amide | 2 | 0.0 |
| | Hydrazine | 2 | 0.0 |

[1] Concentration in percent by weight of polymer present.
[2] Viscosity loss measured in percent.
[3] One percent by weight of poly(ethylene oxide) in water.
[4] Seven percent by weight of poly(ethylene oxide) in water.

From the foregoing data, particularly Table III, it might be assumed that suspension polymerized poly(ethylene oxide) is intrinsically or structurally different from poly(ethylene oxide) prepared by solution polymerization. However, insofar as the degradative effect in solution is due to catalyst residues, the method of polymerization is not believed to be relevant. Moreover, the viscosity loss due to catalyst addition appears to be approximately the same regardless of the intrinsic solution stability or initial viscosity level of the resin. To the extent that there is a difference in viscosity loss between various resins, the degrading effect of the catalyst seems to be somewhat greater in the case of the more intrinsically stable resins. This is obvious from a comparison of the data of Table IV wherein the effect of catalyst addition on two resins of considerably different stability levels is set forth:

TABLE IV.—EFFECT OF CATALYST ON VISCOSITY OF AQUEOUS POLY (ETHYLENE OXIDE) SOLUTIONS OF DIFFERENT INTRINSIC STABILITY AND VISCOSITY LEVEL [1]

[A—Poly(ethylene oxide) Resin Characterized by an Initial Viscosity of 11,900 Centipoises]

| Time | Viscosity loss in percent | |
|---|---|---|
| | Control | Treated solution [2] |
| 2 hours | 0 | 3.8 |
| 2 days | 7.1 | 26.9 |
| 3 days | 10.1 | 34.0 |
| 5 days | 13.9 | 45.2 |
| 7 days | 17.2 | 53.7 |

[B—Poly(ethylene oxide) Resin Characterized by an Initial Viscosity of 8,050 Centipoises]

| 2 hours | 0 | 3.7 |
| 2 days | 12.4 | 34.2 |
| 3 days | 18.0 | 43.1 |
| 5 days | 28.6 | 55.5 |
| 7 days | 38.5 | 63.4 |

[1] One percent by weight of poly(ethylene oxide) in water.
[2] Calcium amide added in a concentration of 2 percent by weight of polymer present.

Table V illustrates the effect of a typical urea derivative in counteracting the degrading action of catalyst residues in poly(ethylene oxide) solutions:

TABLE V.—EFFECT OF UREA DERIVATIVES IN COUNTERACTING THE DEGRADING ACTION OF CATALYST RESIDUE IN POLY(ETHYLENE OXIDE) SOLUTIONS [1]

| Additive [2] | Viscosity loss after one week at 25° C. [3] |
|---|---|
| Control | 23.3 |
| 2 percent calcium amide | 59.9 |
| 2 percent calcium amide and 2 percent thiourea | 39.1 |
| Control | 13.2 |
| 5 percent thiourea | 15.7 |
| 2 percent calcium amide | 88.4 |
| 2 percent calcium amide and 5 percent thiourea | 37.6 |
| Control | 12.3 |
| 2 percent calcium amide | 73.2 |
| 2 percent calcium amide and 5 percent thiourea | 44.9 |

[1] One percent by weight of poly(ethylene oxide) in water.
[2] Concentrations in percent by weight of polymer present.
[3] Viscosity loss measured in percent.

The urea derivatives employed as stablizers in the present invention have been found to be effective when incorporated into any ethylene oxide high polymer containing metal amide catalyst residues, irrespective of the source of these residues, or the subsequent treatment of the resins so prepared. For instance, it has been found that urea derivatives are highly effective for stabilizing resins which have subsequently been reduced in molecular weight by exposure to chlorine gas, peracetic acid, or other oxidizing agents.

The techniques by which the aforesaid stabilizers are incorporated or admixed with the thylene oxide polymer is not critical, and any of a variety of means can be employed to effect initimate admixing of the polymer with the stabilizer. One desirable method involves the admixture of the stabilizer with, for example, poly(ethylene oxide) at the time the latter is formed. Another method which can be advantageously employed comprises introducing the stabilizer of choice into an organic slurry of poly(ethylene oxide), said poly(ethylene oxide) being inert and insoluble in the organic medium. It is preferred that the organic medium be an inert non-solvent for the polymer and that it be an inert solvent for the particular stabilizer contemplated. Removal of the organic medium such as by evaporation or other conventional means results in an intimate admixture of stabilizer and polymer. Suitable inert, organic media are which can be used are saturated aliphatic ethers, ketones, saturated aliphatic hydrocarbons, higher molecular weight saturated alcohols, saturated aliphatic esters, and the like, e.g., dibutyl ether, diethyl ether, dioxane, acetone, methyl ethyl ketone, hexane, cyclohexane, heptane, butanol, ethyl acetate, and others. Additional methods include mixing the stabilizer in finely divided form with the molten polymer; dissolving the stabilizer in polymer solutions, i.e., solvents in which poly(ethylene oxide) is soluble, such as acetic acid, acetonitrile, benzene, chlorobenezene, and water; and admixing finely divided stabilizer and polymer on a two-roll miller, extruder, Banbury mixer, and the like.

As stated previously the present invention contemplates the use of a stablizing amount of the stabilizer of choice to stabilize the polymer against substantial molecular weight degradation. By the term "stablizing amount", as used herein, is meant that quantity of stabilizer which when added to the system containing poly(ethylene oxide), and in particular granular poly(ethylene oxide), is sufficient to effectively stablize the polymer against substantial molecular weight degradation. Expressed differently, a "stabilizing amount" of the stabilizer of choice substantially reduces the loss of reduced or apparent viscosity of the polymer being stabilized, during storage, in transit, etc., as compared with the corresponding polymer not containing therein the stabilizers of this invention. The art is well apprised of the technique of stabilizing organic compounds in general, and the amount of stabilizer employed will be governed, to an extent, by the reduced or apparent viscosity of the ethylene oxide polymer, by the particular stabilizer employed, and other considerations.

In general, a stabilizer concentration range of from about 0.1 weight percent, and lower, to about 5.0 weight percent based on the weight of poly(ethylene oxide), is effective; from about 0.5 to about 3.0 weight percent of stabilizer, based on the weight of polymer, is preferred.

Notwithstanding the fact that urea derivatives are highly effective when incorporated into ethylene oxide polymers, care must be taken in the selection of the particular urea derivatives since many act as degrading agents rather than stabilizers. For instance, such materials as urea oxalate, biurea, biuret, dithiobiuret, certain of the dialkylureas, tertiaryalkylureas, 5-nitrouracil, or 2-thiobarbituric acid degrade ethylene oxide polymers within a matter of a few hours to a polymer of a much lower molecular weight Tables VI and VII which follow illustrate the degrading effect of various chemical agents upon the poly(ethylene oxide) when contained in solution:

TABLE VI.—EFFECT OF HYDRAZINE HYDRATE ON VISCOSITY OF AQUEOUS POLY(ETHYLENE OXIDE) SOLUTIONS [1]

| Concentration of hydrazine hydrate [2] | Viscosity loss after one week at 25° C.[3] |
|---|---|
| 0.0005 | 22.3 |
| 0.001 | 26.3 |
| 0.01 | 51.4 |
| 0.05 | 96.1 |
| 0.1 | 99.2 |
| Control | 18.7 |

[1] One percent by weight of poly(ethylene oxide) in water.
[2] Concentration in percent by weight of polymer present.
[3] Viscosity loss measured in percent.

TABLE VII.—EFFECT OF VARIOUS CHEMICAL AGENTS ON VISCOSITY LOSS OF AQUEOUS POLY(ETHYLENE OXIDE) SOLUTIONS [1]

| Chemical agent | Concentration [2] | Viscosity loss after one week at 25° C.[3] | |
|---|---|---|---|
| | | Comparable control | Treated solution |
| Urea oxalate | 5 | 17.8 | 99.8 |
| 5-nitrouracil | 5 | 17.8 | 97.4 |
| 2-thiobarbituric acid | 5 | 17.8 | 95.7 |
| Biurea | 5 | 17.8 | 92.1 |
| 2,4-dithiobiuret | 5 | 17.8 | 96.7 |
| Hydroquinone | 2 | 18.7 | 99.4 |
| Sodium nitrite | 2 | 19.6 | 82.8 |
| Hydrogen peroxide | 0.1 | 19.6 | 82.6 |
| Acetaldehyde | 2 | 20.6 | 86.4 |
| 1-piperidinomethyl-2-naphthol | 1 | 4.3 | 94.6 |
| Hydrazine | 0.01 | 19.6 | 98.8 |
| Calcium amide | 2 | 23.3 | 59.9 |

[1] One percent by weight of poly(ethylene oxide) in water.
[2] Concentration in percent by weight of polymer present.
[3] Viscosity loss measured in percent.

The preparation of granular poly(ethylene oxide) having a reduced viscosity in acetonitrile in the range from about 1.0 to about 60, and higher, is the subject matter of the application entitled, "Polymerization of Epoxides and New Products Obtained Thereby," by F. N. Hill, J. T. Fitzpatrick, and F. E. Bailey, Jr., Serial No. 587,955, filed May 29, 1956, now abandoned, and assigned to the same assignees as the instant application. This application teaches the preparation of poly(ethylene oxide) by the suspension polymerization of ethylene oxide in contact with about 0.2 to about 10 parts by weight, per 100 parts by weight of monomer, of a catalyst such as the alkaline earth metal amides, hexammoniates, or mixtures thereof. The polymerization reaction is preferably conducted at a temperature in the range from about 0° to 70° C. in the presence of a liquid organic medium such as the normally liquid straight and branch chain saturated hydrocarbons, cyclic and alkyl-substituted cyclic saturated hydrocarbons, and the like, e.g., heptane, methylcyclopentane, etc., in which the ethylene oxide reagent is soluble and the resulting polymer is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state.

By the term "reduced viscosity," as used here, is meant a value obtained by dividing the specific viscosity by the concentration of the polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. Unless otherwise stated, the reduced viscosities herein referred to are measured at a concentration of 0.2 gram of polymer in 100 milliliters of acetonitrile at 30° C. Also, unless otherwise stated herein, the reduced viscosity of poly(ethylene oxide), is a value of at least 1.0 and upwards to 75, and higher.

The term "aqueous viscosity," as used herein, refers to the viscosity of the stated concentration of polymer in water, as measured at two revolutions per minute on a Model RVF Brookfield Viscometer at ambient room temperature, i.e., about 24° to 27° C.

The term "suspension polymerization process," as used herein, refers to polymerization in the presence of an organic medium in which the monomer employed is soluble and the polymer produced is insoluble. A granular polymer, such as granular poly(ethylene oxide), results from the suspension polymerization of an agitated reaction mixture comprising ethylene oxide in contact with a polymerization catalyst therefore, e.g., calcium amide, calcium amide-ethylate, etc., in the presence of an organic medium, e.g., heptane, in which ethylene oxide is soluble and and the resulting poly(ethylene oxide) is insoluble. The granular poly(ethylene oxide) thus produced is obtained in a finely divided solid particle state and resembles finely divided sand in particle size. Unlike the granular poly(ethylene oxide) resulting from the supension polymerization process, bulk and solution polymerization processes yield a polymer which is substantially a homogeneous mass either conforming to the shape of the reaction vessel, or after driving off the organic medium, for example, by means of treating in a Marshall Mill (under vacuum and at slightly elevated temperatures), resembles layers or sheets. This polymer subsequently can be reduced in particle size, for example, by dicing or the like.

The following examples are illustrative:

*Example 1*

The granular ethylene oxide polymer employed in this example was prepared via the suspension polymerization route using ethylene oxide modified alkaline earth metal amide catalyst. The polymer had a reduced viscosity (in acetonitrile) of 37.0; the aqueous bulk viscosity (1.0 weight percent polymer in aqueous solution) was 4,000 centipoises as measured at 2 r.p.m. on the Model RVF Brookfield Viscometer. To the above-said polymer there was added 1.02 weight percent chlorine, followed by agitation for approximately 30 minutes, and subsequently, by neutralization of the polymer admixture (in accordance with the procedure set forth in application Serial No. 668,306, supra). The aqueous bulk viscosity of a 5.0 weight percent aqueous solution of the degraded polymer resulting from the chlorine treatment supra was determined to be 6,120 centipoises as measured at 2 r.p.m. on the above-described viscometer.

The chlorine-degraded polymer (250 parts by weight) was subsequently dissolved in distilled water (4,750 parts by weight). The resulting solution was then divided into several portions. To one portion there was added 2.0 weight percent N,N'-diethylthiourea, based on the weight of polymer is solution; another portion served as the control for this experiment. Both portions were then mixed on a set of roll cans. Initial aqueous bulk viscosities of both solutions were obtained with the Model RVF Brookfield Viscometer using the No. 1 spindle operating at 2 r.p.m. Aqueous bulk viscosities of these solutions were again determined in similar manner after ageing for one week and one month, respectively. The pertinent data and results are shown in Table VIII below.

TABLE VIII

| No. | Stabilizer | Initial viscosity [1] | Storage, 1 week, 25° C. | | Storage, 1 month 25° C. | |
|---|---|---|---|---|---|---|
| | | | Viscosity [1] | Percent loss | Viscosity [1] | Percent loss |
| 1 | Control | 3,070 | 2,420 | 21.2 | 2,280 | 25.7 |
| | N,N'-diethylthiourea | | 2,550 | 16.9 | 2,460 | 18.2 |

[1] Aqueous bulk viscosity measured in centipoises.

*Examples 2–4*

Granular poly(ethylene oxide) prepared via the suspension polymerization route using ethylene oxide modified calcium amide catalyst was employed in these examples. The polymer possesses a reduced viscosity (in acetonitrile) of 63.5; the aqueous bulk viscosity of 1.0 weight percent polymer in aqueous solution was 8,150 centipoises as determined by the viscometer described in Example 1.

Fifty-five grams of the above-described polymer were dissolved in 5.445 grams of distilled water, and the resulting solution was then divided into several portions. To each portion, except one which served as the control, there was added various urea derivatives (5.0 weight percent, based on the weight of polymer in solution), followed by overnight agitation of these samples on a set of roll cans. Initial aqueous bulk viscosities of the several samples were determined, and these viscosity determinations were again repeated after aging for one week, two weeks and one month, respectively, as measured by the viscometer described in Example 1 supra. The pertinent data and results are shown in Table IX below.

TABLE IX

| No. | Stabilizer | Initial viscosity [1] | Storage, 1 week, 25° C. | | Storage, 2 weeks 25° C. | | Storage, 1 month, 25° C. | |
|---|---|---|---|---|---|---|---|---|
| | | | Viscosity [1] | Percent loss | Viscosity [1] | Percent loss | Viscosity [1] | Percent loss |
| | Control | 9,680 | 7,960 | 17.8 | 6,140 | 36.6 | 4,880 | 49.6 |
| 2 | N,N'-di-n-butyl-thiourea | | 8,500 | 12.2 | 8,240 | 14.9 | 7,600 | 21.5 |
| 3 | N,N'-diethylthio-urea | | 8,300 | 14.3 | 7,760 | 19.8 | 7,300 | 23.8 |
| 4 | Thiourea | | 9,140 | 5.6 | 8,240 | 14.9 | 7,160 | 26.0 |

[1] Aqueous bulk viscosity measured in centipoises.

*Examples 5–6*

The granular ethylene oxide polymer used in these examples was prepared by polymerizing ethylene oxide in contact with calcium amide catalyst at 50° C. The resulting polymer had an intrinsic viscosity of 16.8, and contained 1.8 weight percent of N,N,N',N'-tetrakis(2-hydroxypropyl)ethylenediamine which had been incorporated therein as an antioxidant.

Sixty grams of the above-described polymers were dissolved in 5,940 grams of distilled water, and the resulting solution was then divided into several portions. Urea and thiourea (2.0 weight percent, based on the polymer weight) were subsequently added to two of the samples; the remaining sample server as the control. Initial aqueous bulk viscosities of the three samples were determined, and these viscosity determinations were repeated after ageing for one week as measured by the viscometer described in Example 1 supra. The pertinent data and results are set forth in Table X below.

TABLE X

| No. | Stabilizer | Initial Viscosity [1] | Storage, 1 week, 25° C. | |
|---|---|---|---|---|
| | | | Viscosity [1] | Percent loss |
| | Control | 7,320 | 5,700 | 21.7 |
| 5 | Urea | | 6,160 | 15.4 |
| 6 | Thiourea | | 6,620 | 9.1 |

[1] Aqueous bulk viscosity measured in centipoises.

*Examples 7–8*

The polymer used in this experiment was prepared in a manner similar to that of Example 1. As in Example 1, the granular ethylene oxide polymer employed was prepared by suspension polymerization, using ethylene oxide modified amide catalyst. As produced, the polymer had an aqueous bulk viscosity (1.0 weight percent polymer in aqueous solution) of 1,650 centipoises as measured at 2 r.p.m. on the Model RVF Brookfield viscometer. One-hundred five pounds of this resin was charged to a chlorinating vessel and reacted with 0.4 pounds of chlorine for 80 minutes at ambient temperature. The chlorine was purged from the vessel with nitrogen and the remaining chlorine neutralized with ammonia gas, after which 0.505 pound of the monomethyl ether of hydroquinone was added to the resin. The aqueous bulk viscosity of 5.0 weight percent aqueous solution of the chlorine treated polymer was found to be 1475 centipoises as measured at 2 r.p.m. on the above-described viscometer. This polymer (250 parts by weight) was subsequently dissolved in distilled water (4,750 parts by weight) as in Example 1. The solution was divided into four parts, two of which were aged in the unmodified form as replicate control samples. To the third sample there was added 1.0 weight percent of dichloralurea, and to the fourth sample 2.0 weight percent of phenylthiourea (based on the weight of polymer). The four solutions then were mixed briefly on a set of can rolls. Initial aqueous bulk viscosities of all four solutions were obtained with the Model RVF Brookfield Viscometer using the No. 1 spindle operating at 2 r.p.m. Aqueous bulk viscosities of these solutions were again determined in a similar manner after ageing for one week, one month, two months, and three months. The results are shown in Table XI below.

TABLE XI

| No. | Stabilizer | Initial viscosity | Storage, 1 wk., 23.7° C. | | Storage 1 mo., 23.7° C. | | Storage, 2 mos., 23.7° C. | | Storage, 3 mos., 23.7° C. | |
|---|---|---|---|---|---|---|---|---|---|---|
| | | | Viscosity | Percent loss | Viscosity | Percent loss | Viscosity | Percent loss | Viscosity | Percent loss |
| | Controls (average) | 1,535 | 1,510 | 1.6 | 1,455 | 5.2 | 1,425 | 7.2 | 1,365 | 11.1 |
| 7 | Dichloralurea | | 1,510 | 1.6 | 1,500 | 2.3 | 1,440 | 6.0 | 1,450 | 5.5 |
| 8 | Phenylthiourea | | 1,560 | 0.0 | 1,520 | 1.0 | 1,510 | 1.6 | 1,480 | 3.6 |

*Examples 9–10*

The granular poly(ethylene oxide) used in these examples were prepared in the manner similar to that described for Examples 2–4. The polymer possesses an intrinsic viscosity (in acetonitrile) of 11.5; the aqueous bulk viscosity of 1.0 weight percent polymer in aqueous solution was 3,420 centipoises as determined by the viscometer described in Example 1.

Thirty grams of this resin was dissolved in 2,970 grams of distilled water, and the resulting solution then divided into several portions. To each of the portions except two, which were retained as replicate controls, there was added varying concentrations, based on the polymer weight, of different stabilizers. After rolling all samples on a set of can rolls briefly, the initial aqueous bulk viscosities of the control samples were determined. These viscosity determinations were again repeated on all samples after aging for one month. The pertinent data and results are shown in Table XII below.

TABLE XII

| No. | Stabilizer | Weight percent | Initial viscosity | Storage 1 mo., 23.7° C. | |
|---|---|---|---|---|---|
| | | | | Viscosity | Percent loss |
| | Control | | 3,420 | 2,720 | 19.3 |
| 9 | N,N'-diphenylurea | 1.0 | | 2,930 | 14.3 |
| 10 | Dichloralurea | 0.5 | | 2,890 | 15.5 |

Examples 11–13

The poly(ethylene oxide) sample used in this example was prepared in a manner similar to that of the previous example, and was found to have an aqueous bulk viscosity of 1.0 weight percent polymer in aqueous solution of 3,335 centipoises as determined by the viscometer described in Example 1. Samples of solution were prepared in the manner described in the previous example and divided into several parts. The ageing and measurement schedule was run as before, with the pertinent data and results shown in Table XIII below.

TABLE XIII

| No. | Stabilizer | Weight percent | Initial viscosity | Storage 1 wk., 23.7° C. | | Storage 2 mos., 23.7° C. | |
|---|---|---|---|---|---|---|---|
| | | | | Viscosity | Percent loss | Viscosity | Percent loss |
| | Controls (average) | | 3,335 | 3,210 | 4.3 | 2,335 | 30.0 |
| 11 | Dichloralurea | 2 | | 3,230 | 3.2 | 2,890 | 13.3 |
| 12 | N,N'-diphenylurea | 2 | | 3,300 | 1.1 | 3,100 | 7.0 |
| 13 | Phenylthiourea | 2 | | 3,200 | 4.1 | 2,890 | 13.3 |

Examples 14–23

The sample of poly(ethylene oxide) used in this example is similar to that of Examples 11–13. It had an initial bulk aqueous viscosity of one weight percent solution in water of 1,970 centipoises, measured as previously described. Solutions of the polymers were prepared and divided according to the description in the previous example. Pertinent data and results are shown in Table XIV and XV below.

TABLE XIV

| No. | Stabilizer | Weight percent | Viscosity | Storage, 1 wk., 23.7° C. | | Storage 1 mo., 23.7° C. | |
|---|---|---|---|---|---|---|---|
| | | | | Viscosity | Percent loss | Viscosity | Percent loss |
| | Control (average) | | cps. 1,970 | 1,778 | 9.6 | 1,275 | 33.6 |
| 14 | N,N'-di-n-butylthiourea | 2 | | 1,790 | 6.8 | 1,670 | 13.0 |
| 15 | Acetylthiourea | 2 | | 1,760 | 8.3 | 1,660 | 13.5 |
| 16 | N,N'-diethylthiourea | 2 | | 1,820 | 5.2 | 1,740 | 9.4 |
| 17 | Allylthiourea | 2 | | 1,790 | 6.8 | 1,640 | 14.6 |

TABLE XV

| No. | Stabilizer | Weight percent | Viscosity | Storage, 7 wks., 23.7° C. | |
|---|---|---|---|---|---|
| | | | | Viscosity | Percent loss |
| | Control (average) | | 1,970 | 280 | 86.2 |
| 18 | meta-Tolylurea | 2 | | 1,390 | 31.2 |
| 19 | Acetylurea | 2 | | 830 | 58.9 |
| 20 | Phenylurea | 2 | | 760 | 62.4 |
| 21 | N-acetyl-N'-methylurea | 2 | | 1,390 | 31.2 |
| 22 | N,N-diphenylurea | 2 | | 920 | 54.5 |
| 23 | N,N'-diphenylthiourea | 2 | | 730 | 63.9 |

Although the invention has been illustrated by the preceding examples, the invention is not to be construed as limited to the materials employed therein, but rather, the invention encompasses the generic areas as hereinbefore disclosed. Various modifications and embodiments of this invention can be made without departing from the spirit and scope thereof.

What is claimed is:

1. A composition comprising an ethylene oxide polymer wherein said polymer is prepared by the suspension polymerization of ethylene oxide in the presence of a catalyst selected from the group consisting of alkaline earth metal amides, alkaline earth metal hexammoniates, and alkaline earth metal amide-alcoholates, and a stabilizing amount of a compound selected from the group consisting of urea, arylurea, acylurea, N-acyl-N'-alkylurea, dichloralurea, N,N'-diarylurea, N,N-diarylurea, thiourea, alkenylurea, alkylthiourea, arylthiourea, acylthiourea, N,N'-dialkylthiourea, and N,N'-diarylthiourea.

2. The composition of claim 1 wherein said compound is N,N'-diarylurea.

3. The composition of claim 1 wherein said compound is N,N'-diarylthiourea.

4. The composition of claim 1 wherein said compound is N,N'-dialkylthiourea.

5. The composition of claim 1 wherein said compound is arylthiourea.

6. A composition comprising an ethylene oxide polymer wherein said polymer is prepared by a suspension polymerization of ethylene oxide in the presence of a catalyst selected from the group consisting of alkaline earth metal amides, alkaline earth metal hexammoniates, and alkaline earth metal amide-alcoholates, and a stabilizing amount of N,N'-diphenylurea.

7. A composition comprising an ethylene oxide polymer wherein said polymer is prepared by a suspension polymerization of ethylene oxide in the presence of a catalyst selected from the group consisting of alkaline earth metal amides, alkaline earth metal hexammoniates, and alkaline earth metal amide-alcoholates, and a stabilizing amount of N,N'-diphenylthiourea.

8. A composition comprising an ethylene oxide polymer wherein said polymer is prepared by a suspension polymerization of ethylene oxide in the presence of a catalyst selected from the group consisting of alkaline earth metal amides, alkaline earth metal hexammoniates, and alkaline earth metal amide-alcoholates, and a stabilizing amount of N,N'-diethylthiourea.

9. A composition comprising an ethylene oxide polymer wherein said polymer is prepared by a suspension polymerization of ethylene oxide in the presence of a catalyst selected from the group consisting of alkaline earth metal amides, alkaline earth metal hexammoniates, and alkaline earth metal amide-alcoholates, and a stabilizing amount of phenylthiourea.

10. A composition comprising an ethylene oxide polymer wherein said polymer is prepared by a suspension polymerization of ethylene oxide in the presence of a catalyst selected from the group consisting of alkaline earth metal amides, alkaline earth metal hexammoniates, and alkaline earth metal amide-alcoholates, and a stabilizing amount of urea.

11. A composition comprising an ethylene oxide polymer wherein said polymer is prepared by a suspension polymerization of ethylene oxide in the presence of a catalyst selected from the group consisting of alkaline earth metal amides, alkaline earth metal hexammoniates, and alkaline earth metal amide-alcoholates, and a stabilizing amount of thiourea.

References Cited by the Examiner

UNITED STATES PATENTS

| | | | |
|---|---|---|---|
| 2,492,955 | 6/50 | Ballard et al. | 260—615 |
| 2,822,412 | 2/58 | Ambelany | 260—45.9 |
| 2,848,501 | 8/58 | Lloyd | 260—611.5 |
| 2,877,193 | 3/59 | Roussel | 260—45.9 |
| 2,893,972 | 7/59 | Kubico et al. | 260—45.9 |
| 2,897,178 | 7/59 | Hill | 260—45.9 |
| 2,942,033 | 6/60 | Leis et al. | 260—611.5 |
| 2,960,488 | 11/60 | Tamblyn | 260—45.9 |

FOREIGN PATENTS 748,856   12/53   Great Britain.

LEON J. BEROVITZ, *Primary Examiner.*

ALPHONSO D. SULLIVAN, JOSEPH LIBERMAN,
*Examiners.*